United States Patent [19]
Boye et al.

[11] Patent Number: 5,875,648
[45] Date of Patent: Mar. 2, 1999

[54] PROCESS FOR THE MANUFACTURE OF A UNIT CONTAINING A SOLID ACTIVE MATERIAL WHICH CAN BE USED FOR PRODUCING COLD, UNIT OBTAINED AND REFRIGERATING DEVICE COMPRISING THIS UNIT

[75] Inventors: Philippe Boye, Sete; Didier Claude Joseph Felix Heinry, Saleilles, both of France

[73] Assignee: Manufactures de Vetements Paul Boye S.A., France

[21] Appl. No.: 981,326

[22] PCT Filed: Jul. 5, 1996

[86] PCT No.: PCT/FR96/01059

§ 371 Date: Jan. 7, 1998

§ 102(e) Date: Jan. 7, 1998

[87] PCT Pub. No.: WO97/03328

PCT Pub. Date: Jan. 30, 1997

[30] Foreign Application Priority Data

Jul. 7, 1995 [FR] France .................................. 95/08261

[51] Int. Cl.$^6$ .............................. F25B 35/04; B01J 3/04; F16J 12/00
[52] U.S. Cl. ............................ 62/480; 220/589; 156/172; 156/180
[58] Field of Search .............................. 62/480, 497, 298, 62/481; 220/589, 590, 592.01, 126; 156/172, 176, 180, 175

[56] References Cited

U.S. PATENT DOCUMENTS

| 2,338,712 | 1/1944 | Erland Af Kleen . | |
|---|---|---|---|
| 3,321,347 | 5/1967 | Price et al. . | |
| 4,778,073 | 10/1988 | Ehs . | |
| 4,901,535 | 2/1990 | Sabin et al. | 62/480 |
| 5,287,987 | 2/1994 | Gaiser | 220/589 |
| 5,291,942 | 3/1994 | Ryan | 165/104.12 |
| 5,384,101 | 1/1995 | Rockenfeller | 422/175 |
| 5,545,278 | 8/1996 | Chen et al. | 156/175 |

FOREIGN PATENT DOCUMENTS

| 0 260 217 | 3/1988 | European Pat. Off. . |
| 0 283 544 | 6/1988 | European Pat. Off. . |
| 0 323 247 | 7/1989 | European Pat. Off. . |
| 0 353 850 | 2/1990 | European Pat. Off. . |
| 0 410 884 | 1/1991 | European Pat. Off. . |
| 1 356 673 | 3/1964 | France . |
| 1 414 309 | 10/1965 | France . |
| WO 92/20954 | 11/1992 | WIPO . |
| WO 64/23253 | 10/1994 | WIPO . |

*Primary Examiner*—William Doerrler
*Attorney, Agent, or Firm*—Blank Rome Comisky & McCauley LLP

[57] ABSTRACT

A method for making a unit including a pressure-sealed container (2) with at least one connecting port (3), and an active solid (1) placed in said container (2). The container (2) is formed directly on a preformed body of the active solid (1) and made of a material having a thermal conductivity of more than 18 W/m. K. The resulting units are particularly useful for making portable air-conditioning devices for garments.

18 Claims, 2 Drawing Sheets

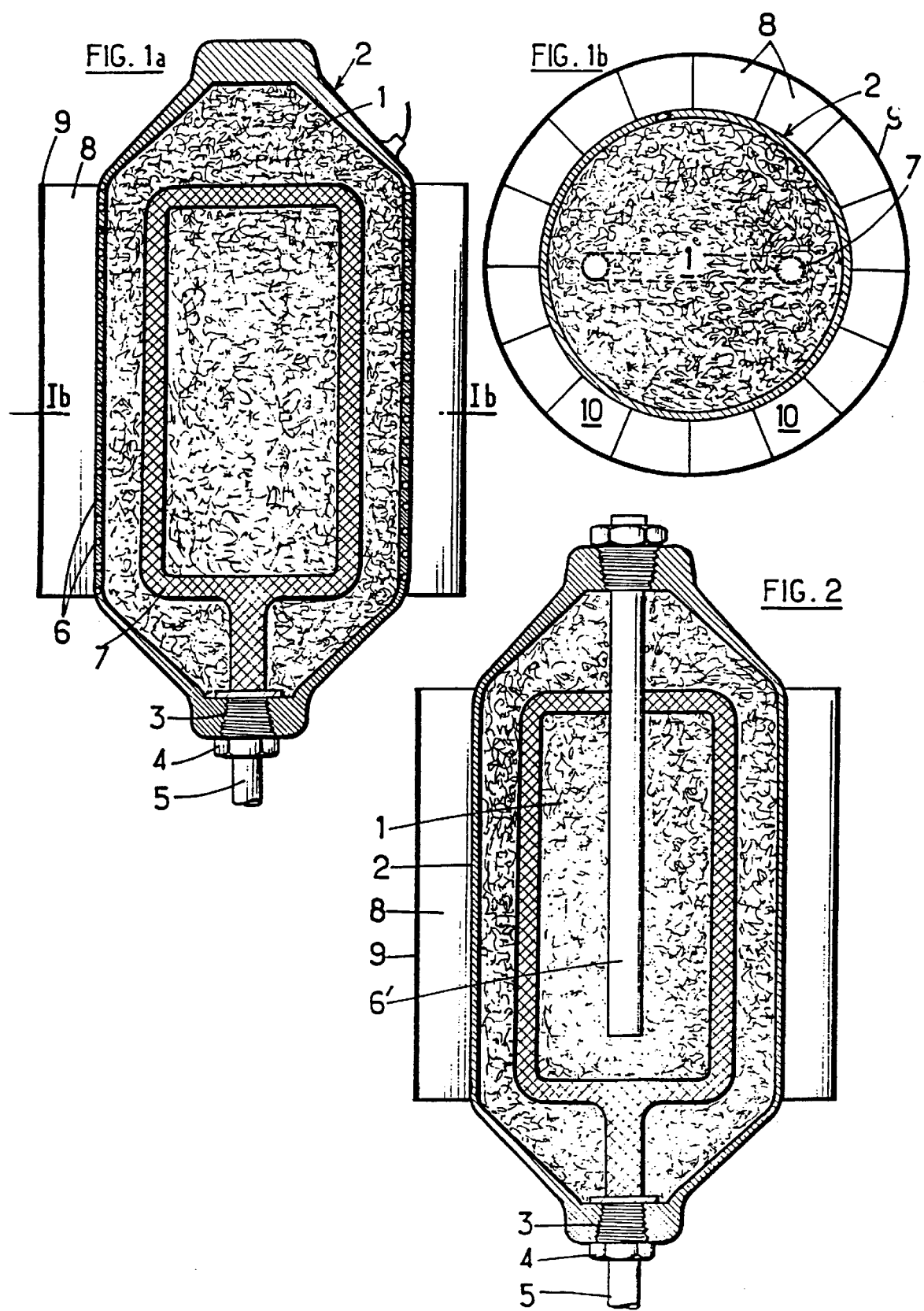

PROCESS FOR THE MANUFACTURE OF A UNIT CONTAINING A SOLID ACTIVE MATERIAL WHICH CAN BE USED FOR PRODUCING COLD, UNIT OBTAINED AND REFRIGERATING DEVICE COMPRISING THIS UNIT

The invention relates to a process for the manufacture of a unit containing a solid active material which can be used for the production of cold, the unit thus obtained and a refrigerating device comprising at least one such unit.

There are many known systems for producing cold which are based on the reaction of a solid active material such as a metal salt with a gas such as ammonia, or else on the desorption of a gas, such as carbon dioxide or ammonia, previously adsorbed and/or absorbed in a solid material such as active carbon, active carbon fibers, zeolites, expanded graphite and the like.

In practical embodiments of these systems the solid active material is generally placed in the more or less packed state in a metal container or vessel connected by a conduit to the other components of the system. In operation the negative calories generated in the active material are transmitted first to the container and then, from there, to the fluid (for example air) to be cooled by heat exchange components such as metal fins mounted on the container. This kind of structure is relatively inefficient thermally because the transfer of the negative calories from the active material toward the container takes place badly as a result of a mediocre physical contact between the internal surface of the container and the active material which it contains. There is therefore a need for a unit containing an active solid material which can be used for the production of cold, exhibiting improved performance.

The invention is aimed especially at providing a process for the manufacture of such an improved unit.

The invention is based on the concept consisting in forming the container directly around the active material rather than first forming the container and subsequently filling it with the active material.

More precisely, the invention relates to a process for the manufacture of a unit including a pressure-resistant container provided with at least one connecting orifice, and an active solid material contained in said container, in which the container is formed directly on a preformed body of active material, the said container being made of a material which has a thermal conductivity higher than 18 W/m.K.

The container can be made by various techniques, such as encapsulation, but is preferably formed by filament winding techniques.

The technique of filament winding is well known and was developed more than 20 years ago by NASA. This technique is commonly employed for producing various articles such as compressed-air cylinders for divers, or tubes. This technique consists in winding around a former forming a mandrel a continuous filament or band, for example made of glass fiber, carbon fiber, aramid fiber, ceramic fiber or metal fiber, usually preimpregnated with an appropriate binder such as a resin in the curable B state, for example a polyester resin, an epoxy resin, a polyamide resin, a silicone resin or a phenolic resin and then, once the winding is finished, in curing the resin to form the desired article. Alternatively, the filament may be coated with a curable resin just before it is wound onto the mandrel, or else a filament can be wound "dry" and the resulting article can be impregnated under pressure with binder resin, and the resin can be finally cured. Another alternative form consists in employing a thermoplastic resin, in which case the consolidation of the article requires the application of heat and pressure. The winding may be of the circumferential, polar or helical type or may combine two or more of these types.

Numerous articles and patents dealing with filament winding are available in the published literature, and various machines and materials for implementing it are available commercially. It therefore does not appear necessary to describe this technique in greater detail here.

For the purpose of the invention, however, it is appropriate to choose a filament/binder pair which forms a composite material which has good thermal conductivity, namely higher than 18 W/m.K, this value corresponding approximately to the thermal conductivity of steel.

To attain this objective it is possible, for example, to employ a carbon or metal filament, preferably carbon, and a curable binder resin filled with metal particles or flakes, for example of aluminum, or of carbon or graphite. It is preferred, however, to employ an all-carbon binder.

As indicated above, one of the original special features of the invention lies in the formation of the container directly around a preformed body of solid active material. In the case where the storage vessel is produced by the preferred technique of filament winding, said preformed body serves as a mandrel receiving the filament during the winding of the latter.

The preformed body may consist of any reactive or adsorbent solid material employed in a system for producing cold. Examples of adsorbent solid materials are expanded graphite, active carbon, activated carbon fibers, zeolites and the like. Examples of reactive solid materials are metal halides such as barium chloride, manganese chloride, nickel chloride and calcium chloride, metal carbonates, sulfates and nitrates, oxides, and the like, taken alone or in combination or with an activating material such as expanded graphite, recompacted or not.

These active materials can adsorb, or react with, gases or vapors, such as ammonia, amines, methanol, ethanol, carbon dioxide, sulfur dioxide and trioxide, and the like.

Examples of active materials and of systems for producing cold can be found in FR-A-2 626 496, FR-A-2 642 509, EP-A1-0 129 473 and WO-A-91/15292, among others.

The body of active material must, quite obviously, have a sufficient cohesion to withstand the winding process. Various binders can be employed for this purpose, but it has been found that recompacted expanded graphite, as described in EP-A-0 129 473, forms an excellent binder, additionally promoting the active material/gas reaction.

Since the winding of the filament on the material-forming body is usually performed with the filament under some tension, the container finally obtained exerts a marked pressure on the body, thereby ensuring an excellent physical and thermal contact between the internal surface of the container and the material contained therein.

The invention also relates to the unit obtained by the process of the invention and in particular a unit in which the container consists of a filament winding which is a good heat conductor, preferably a winding of carbon fiber in which the various turns or coils are bonded together by a thermoconductive binder forming a matrix for the filament, so as to form a composite material which has a thermal conductivity higher than 18 W/m.K.

The unit of the invention may optionally comprise additional components. Thus, in order to improve the heat exchange with the fluid to be cooled, the unit may be equipped, on the external surface of the container, with large-surfaced heat exchange members such as fins, made of a material that is a good heat conductor and, optionally, with an insulating peripheral enclosure surrounding the said members, the members and the enclosure defining, with the wall of the storage vessel, one or more channels for passing the fluid to be cooled. The members, for example fins, may be attached onto the container by being positioned on the filament winding before the binder is cured, so as finally to obtain an integral unit/members combination.

If desired, the insulating peripheral enclosure may also be formed by the filament winding technique or may be produced separately and subsequently fitted around the heat exchange members.

The unit can also be provided with porous or perforated diffusing means which are embedded in the active material and intended to facilitate the circulation of the gas within the bulk of active material.

Lastly, the unit may be provided with heating means, such as an electrical resistance heater, which are intended to enable the unit to be regenerated after a stage of producing cold.

It should be noted, however, that the unit can also be regenerated by an external means of heating, for example by passing a stream of hot fluid (gaseous or liquid) around the unit.

The unit of the invention, which comprises a container made of composite material, is much lighter than a similar unit in which the container is made of stainless steel, the saving in weight, insofar as the container is concerned, being of the order of a factor of 4.

The description which is to follow, given with regard to the appended drawings, will make the invention properly understood.

In the drawings:

FIG. 1a is a diagrammatic view in axial section of a first unit according to the invention;

FIG. 1b is a diagrammatic view in cross-section along the line 1b—1b of FIG. 1a, of this first unit;

FIG. 2 is a diagrammatic view in axial section of a second unit according to the invention;

Figure 3:
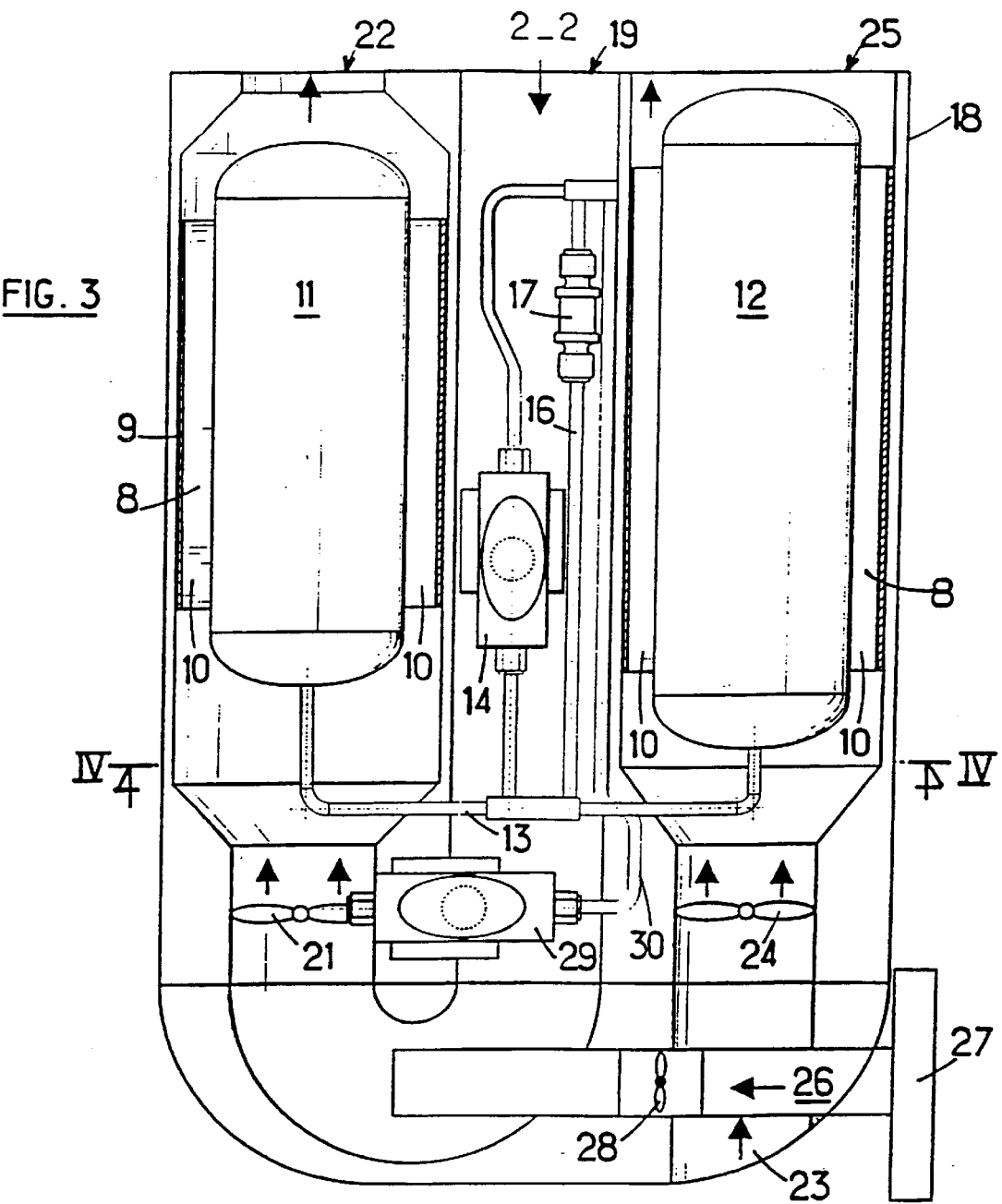
FIG. 3 is a diagrammatic plan view of a refrigerating device making use of units according to the invention, one of the half-shells forming the casing of this device being removed.

FIGS. 1a and 1b show a first embodiment of a unit according to the invention. This unit includes a body or block of active material 1 and a container 2 formed by winding a carbon fiber preimpregnated with a curable carbon binder around this body, and then curing the binder by crosslinking. The wall thickness of the container 2 must be sufficient for the container to hold the pressure to which it may be subjected in use and which can reach several tens of bars, according to circumstances. The container comprises a tapped orifice 3 enabling a coupling 4 to be screwed therein for connecting the unit to other components of a refrigerating device via a conduit 5. The container illustrated incorporates, within its wall thickness, an optional electrical resistance heater 6. A perforated tubular diffuser 7 is advantageously embedded in the active material 1 to facilitate the conveying of the gas from the connecting orifice toward the most distant portions of the active material. The unit also includes lengthwise fins 8 made of carbon, fixed perpendicularly to the outer surface of the container, and a cylindrical casing 9 made of insulating material, for example of plastic, placed around the fins, the outer surface of the casing, the enclosure 9 and the fins 8 defining channels 10 intended for passing the fluid to be cooled. The active material 1 may be any one of the active materials known to be usable for the production of cold.

FIG. 2 illustrates a unit which is similar to that of FIG. 1, except that the optional resistance heater 6, instead of being embedded in the wall of the container, is in the form of a rod heater 6' placed axially in the body of active material.

Figure 4:
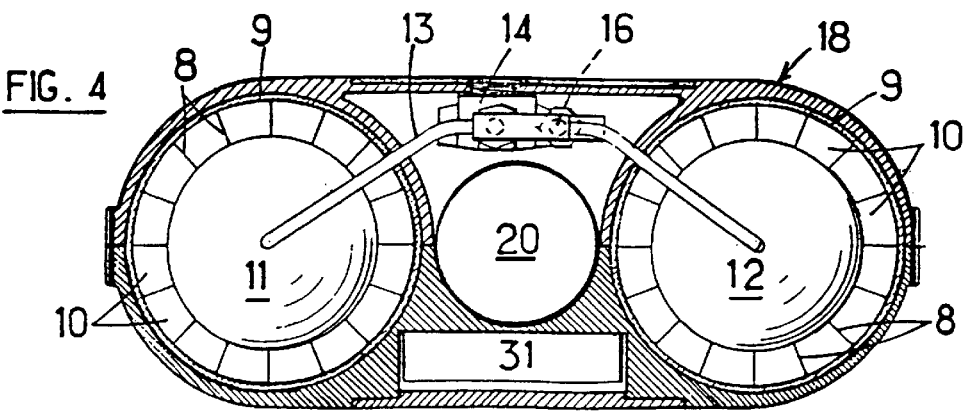
FIG. 4 is a diagrammatic view in partial cross-section of this device.

FIGS. 3 and 4 illustrate a portable airconditioning device intended to be connected to a garment, such as an overall or jacket, which is to be worn in a "hot" environment, in order to "air-condition" it.

This device comprises two units according to the invention, namely a "cold" unit 11 and a "hot" unit 12. The cold unit is filled, for example, with a mixture of expanded graphite and barium chloride which has previously been reacted with ammonia to form solid $BaCl_2.8NH_3$, kept under pressure in the container of the unit 1. This product is capable of decomposing endothermally to $BaCl_2$ and (gaseous) $NH_3$ when the pressure is released.

The hot unit 12, which is at a pressure that is lower than that prevailing in the unit 11, is filled with a mixture of expanded graphite and of manganese chloride, capable of reacting exothermally with the released ammonia originating from the unit 11 when these two units are connected to each other.

The units 11 and 12 have a structure which is similar to the unit of FIG. 2, unit 12 being, however, of a larger size than that of the unit 11, since the capacity of $MnCl_2$ to absorb $NH_3$ by reaction is smaller than that of $BaCl_2$.

The unit 11 can be brought into communication with the unit 12 by means of the conduit 13 and a valve 14 fitted in this conduit. A conduit 16 equipped with a nonreturn valve 17 is fitted as a bypass of valve 14.

Units 11 and 12 are fitted in a casing 18 made of plastic, for example in two demountable portions. This casing comprises an entry 19 for recycled air, which is relatively warm, originating from the air-conditioned garment (not shown). This recycled air passes first through a tube 20 filled with a drying agent (for example silica gel), passes through a first fan 21 and is conveyed into the heat exchange channels 10 of the unit 11, where it is cooled before being reinjected into the air-conditioned garment from the exit 22. The casing also comprises an entry 23 for ambient air. The ambient air entering at 23 is drawn in by a second fan 24, passed through the heat exchange channels 10 of the unit 12 with a view to cooling the latter, and then leaves for the atmosphere at 25. The casing also comprises a second entry 26 for ambient air, which may, optionally, be preceded by an NBC (nuclear-bacteriological-chemical) cartridge 27, and a third fan 28. The air entering at 26 is drawn in by the fan 28 and is mixed with the stream of recycled air, compensating for the air conditioning air losses which occur in the garment, the air conditioning air being usually maintained at overpressure in relation to atmospheric pressure.

The device also includes a purge valve 29, normally closed, one of the ends of which is connected to the conduit 13 by a conduit 30 and the other end of which is open to the atmosphere. Lastly, it includes a battery 31 used to power the various fans, the electrical connections between the battery and the fans not being shown for reasons of clarity of illustration.

To produce cold, the unit 11, which is assumed to be filled under pressure with the product $CaCl_2.NH_3$, is connected to the unit 12 by opening the valve 14 and by adjusting this valve to set the flow rate of ammonia and, hence, the extent of the production of cold by the unit 11.

The ammonia released reacts exothermally with the manganese chloride in the unit 12, resulting in the need to cool the unit 12 with a stream of ambient air originating from the entry 23.

When the unit 11 is exhausted, it can be regenerated by heating the unit 12 by means of the resistance heater 6', by connecting the latter to a source of electrical current. With the valves 14 and 15 having been closed beforehand, the ammonia which had combined with the manganese chloride during the cold-producing cycle dissociates from the latter and flows in the conduit 13 and then in the conduit 16 via the valve 17, in the direction of the unit 11, where it recombines with the barium chloride. The unit 11 is then ready for re-use.

The purge valve 29 is used for maintaining the system and for draining the units when this is desired.

The device of the invention lends itself to a compact implementation and can be easily included in a back-pack.

We claim:

1. A process for the manufacture of a unit including a pressure-resistant container provided with at least one connecting orifice, and an active solid material useful for producing cold contained in said container, which comprises preforming a body of active material, then forming a pressure-resistant, thermo-conducting container directly on said body.

2. The process as claimed in claim 1, wherein said container is formed by filament winding.

3. A process as claimed in claim 1, wherein said thermo-conducting container is made by winding a filament selected in the group consisting essentially of carbon and metal filaments, and bonding the turns or coils of said filament with a binder selected in the group consisting essentially of a cured resin filled with metal particles or flakes, carbon or graphite, and of a carbon binder.

4. The process as claimed in claim 3, wherein a carbon filament is wound.

5. The process as claimed in claim 4, wherein the turns or coils of the carbon filament are bonded together with a carbon binder forming a matrix.

6. A unit including a body of solid active material which can be used for producing cold, and a pressure-resistant container provided with coupling means, containing said body, wherein said container is comprised of a filament winding made directly on said body and the turns or coils of said winding being bonded together by a thermoconductive binder forming a matrix for said filament, said filament winding and said binder forming a thermoconducting composite material.

7. A unit as claimed in claim 6, wherein the filament of said filament winding is selected in the group consisting essentially of carbon and metal filaments and said thermoconductive binder is selected in the group consisting essentially of a cured resin filled with metal particles or flakes, carbon or graphite, and of a carbon binder.

8. The unit as claimed in claim 7, wherein said filament winding is made of carbon.

9. The unit as claimed in claim 7, wherein said binder is made of carbon.

10. The unit as claimed in claim 6, wherein said unit additionally includes heat exchange members on the external surface of the container.

11. The unit as claimed in claim 10, wherein said members are fins.

12. The unit as claimed in claim 10, wherein a thermally insulating peripheral casing is provided around the heat exchange members.

13. The unit as claimed in claim 6, which additionally includes an electrical resistance heater.

14. The unit as claimed in claim 6, which additionally includes porous or perforated diffusing means embedded in said solid active material.

15. A unit as claimed in claim 6, which has a thermal conductivity higher than 18 W/m.K.

16. A device for producing cold, which comprises at least one unit including a body of solid active material which can be used for producing cold, and a pressure-resistant container provided with coupling means, containing said body, wherein said container is comprised of a filament winding made directly on said body and the turns or coils of said winding being bonded together by a thermoconductive binder forming a matrix for said filament, said filament winding and said binder forming a thermoconducting composite material.

17. The unit as claimed in claim 11, wherein a thermally insulating peripheral casing is provided around the heat exchange members.

18. The unit as claimed in claim 7, which has a thermal conductivity higher than 18 W/m.K.

* * * * *